United States Patent

[11] 3,566,099

| [72] | Inventor | Albert S. Makas |
| | | Medford, Mass. |
| [21] | Appl. No. | 762,280 |
| [22] | Filed | Sept. 16, 1968 |
| [45] | Patented | Feb. 23, 1971 |
| [73] | Assignee | Polaroid Corporation |
| | | Cambridge, Mass. |

[54] LIGHT PROJECTION ASSEMBLY
4 Claims, 2 Drawing Figs.

[52] U.S. Cl. .................................................. 240/9.5,
350/147, 350/152, 350/156
[51] Int. Cl. .................................................. F21v 9/14
[50] Field of Search .......................................... 240/9.5;
350/147, 152, 156

[56] References Cited
UNITED STATES PATENTS
2,748,659  6/1956  Geffcken et al. .............  240/9.5X

*Primary Examiner*—John M. Horan
*Assistant Examiner*—Richard A. Wintercorn
*Attorneys*—Brown & Mikulka, William D. Roberson and Leonard S. Selman ABSTRACT: Apparatus for projecting a beam of uniformly polarized light. A planar reflective-transmissive polarizer in combination with a quarter-wave plate is used in front of a reflector. The polarization component initially rejected by the polarizer is reflected or backscattered rather than being absorbed. Its polarization azimuth is altered by the quarter-wave plate and reflector to match that of the initially transmitted polarization component. Therefore, substantially all light emitted by the apparatus's source is eventually projected outwardly, uniformly polarized.

PATENTED FEB 23 1971  3,566,099

INVENTOR.
Albert S. Makas
BY
Brown and Mikulka
Leonard S. Selman
ATTORNEYS

LIGHT PROJECTION ASSEMBLY

BACKGROUND AND SUMMARY OF THE INVENTION

The light-projecting assembly as described herein utilizes a polarizer of the type disclosed in U.S. Pat. Application, Ser. No. 762,211 filed herewith or in the U.S. Pat. Application, Ser. No. 716,775 filed Mar. 28, 1968, now abandoned both assigned to the assignee of the present application. These polarizers referred to herein as the reflective-transmissive-type have the property of dividing incident light into substantially two linearly polarized components of opposite polarization characteristics. One of the components passes through the polarizer while the other component is reflected backward. The present invention provides a unique combination of elements to change the polarization characteristics of the reflected component to that of the transmitted component and then directs it out through the polarizer so that the output of the light projecting assembly is substantially increased as to the amount of uniformly polarized light transmitted thereby.

The preferred embodiment of the invention comprises a light source mounted within a substantially parabolic polished metal open-mouthed reflector. The reflective-transmissive polarizer is mounted over the mouth of the reflector and receives light directly from the light source and from the various reflecting surfaces of the reflector. As pointed out, one component of the incident light is transmitted by the polarizer and the other oppositely polarized component is reflected backward whereupon it is made to pass through a quarter-wave plate which is positioned directly behind the polarizer. The quarter-wave plate has the effect of circularly polarizing the reflected component. The component which will be taken as having right circular polarization characteristics is then reflected off the shiny metal surface which has the effect, as known in the art, of reversing the polarity and the reflected beam will be found to exhibit left circular polarization. When the reversed component passes back through the quarter-wave plate, it will emerge as light linearly polarized in the same direction as that of the original component transmitted by the polarizer and thus will pass through the polarizer reinforcing the transmitted component.

Thus, the light transmitted by the light projection assembly will be substantially uniformly polarized and the light output of the assembly will be greatly enhanced by the reinforcement of the transmitted component. This is accomplished with the use of relatively few inexpensive elements which are easy to manufacture and assemble. The uses contemplated for the assembly include antiglare headlight systems for vehicles, as well as monoscopic and stereoscopic projection systems, and the like. Since the polarizers utilized in this assembly are quite efficient as pointed out in the aforementioned applications this type of assembly seems quite promising especially for use in vehicle headlights where a substantial amount of light is required.

Accordingly, it is an object of this invention to provide a novel polarizing assembly which projects a beam of substantially uniformly polarized light of substantial intensity.

It is a further object of this invention to provide a novel polarizing assembly including a reflective-transmissive polarizer, said assembly treating the reflected component of light incident on said polarizer in a manner to afford to said component polarization characteristics of the transmitted component so that the output of said assembly consists of a beam of substantially high intensity uniformly polarized light.

DESCRIPTION OF THE PREFERRED EMBODIMENT

Figure 1:
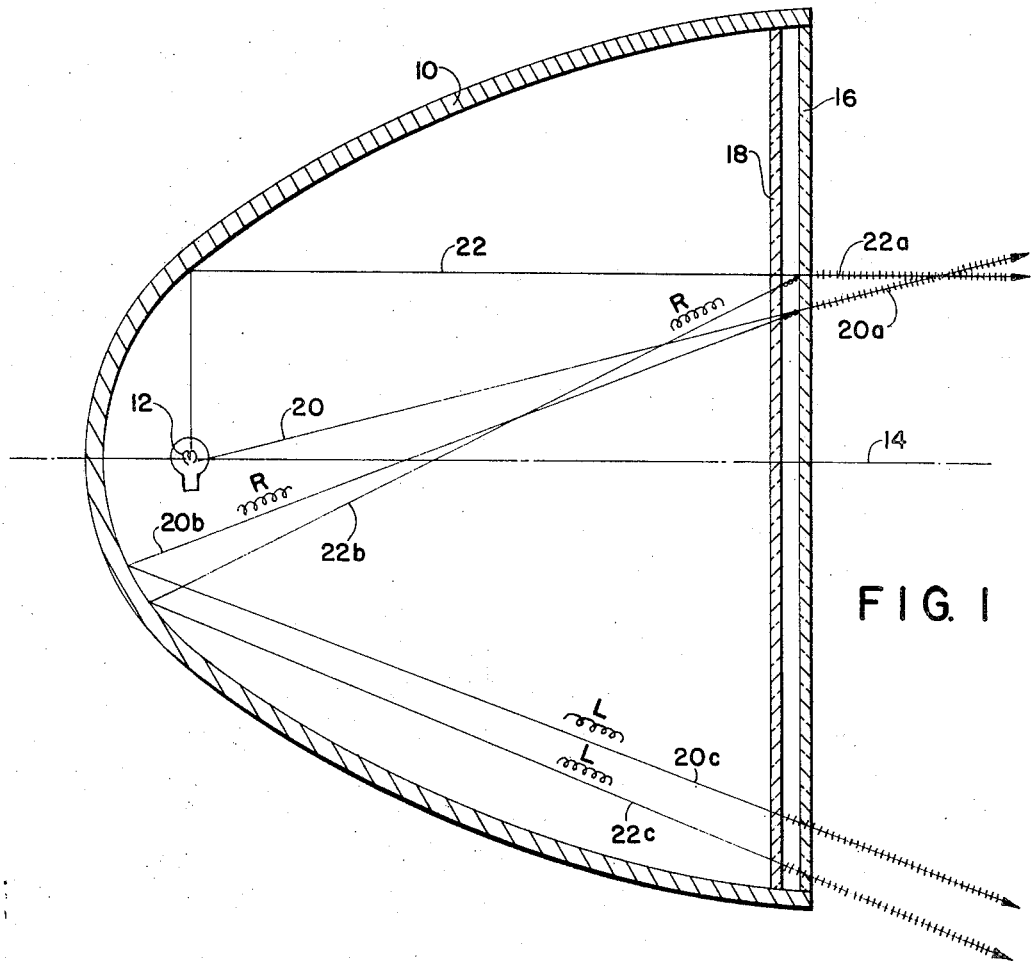
FIG. 1 of the drawing is a diagrammatic representation partially in cross section of a preferred embodiment of a light projection assembly of the invention.

The drawing depicts a light projection assembly which in this embodiment represents an auto headlight which emits light uniformly linearly polarized and vibrating in a selected plane depending upon the orientation of the polarizer used. In antiglare headlight systems, each approaching automobile may have a polarizer in or over its windshield as well as a pair of polarized headlights. In one scheme, all the linear polarizers are oriented at 45° so that the axes of a given car's headlight and windshield polarizers are parallel maximizing the driver's utilization of light from his own headlights, but "crossed" with the headlights of the approaching car which eliminates the glare therefrom.

Accordingly, the headlight shown in the drawing consists of a parabolic shaped highly polished metal reflector 10 having a light source 12 mounted on optical axis 14 of the reflector at the focus thereof. The reflector has an open mouth and mounted across said mouth is a reflective-transmissive-type polarizer 16 and a quarter-wave plate 18 directly behind it. Light 22 emanating from said source 12 is representative of the many rays which are reflected off the polished surface of the reflector 10 which due to its parabolic shape will direct the rays toward the mouth of the reflector in parallel relationship to one another and to the optical axis 14. Light ray 20 represents those rays which travel directly from said source to said reflector mouth. The rays 20 and 22, which are shown schematically, pass through the plate 18 and are divided into substantially two components by polarizer 16 which is of the type which transmits one component represented by rays 20a and 22a which are not linearly polarized and vibrating in a plane at 45° to the horizontal and reflects a second component represented by rays 20b and 22b with opposite polarization characteristics. The two differing polarization azimuths are indicated in the drawing by the lines and circles on each ray. The reflected component is actually composed of light which is either scattered backward by the polarizer in many different directions or reflected substantially straight backward depending upon the particular kind of polarizer used. The pair of rays 20b and 22b are two of many such rays which re directed backward. As each of these rays 20b and 22b pass through the quarter-wave plate 18 they emerge circularly polarized and for the sake of this embodiment we will say the sense of this polarization is right handed as indicated in the drawing. Each ray 20b and 22b is reflected off the polished metal surface 24 of the reflector 10 whereby it will suffer a reversal in the sense of its polarization characteristic, a phenomenon well known in the art, and each ray 20c and 22c is depicted as having left handed circularity polarity. When the rays 20c and 22c pass back through the quarter-wave plate 18 they will emerge as linearly polarized light now with the same polarity of the transmitted component and will serve to reinforce this component to intensify the output of the polarized light emanating from the headlight.

Figure 2:
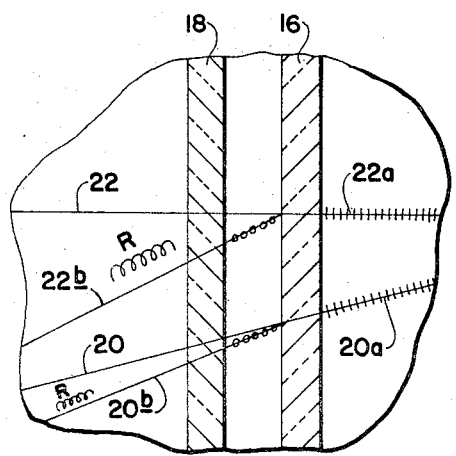
FIG. 2 is an enlarged fragmentary view showing the effect of the polarizer and quarter-wave plate on the light rays incident thereon.

FIG. 2 is an enlarged fragmentary view of the polarizer 16 and the quarter-wave plate 18 showing more clearly how the incident light represented by light rays 20 and 22 are acted upon by those elements. The rays 20 and 22 initially pass through plate 18 and are substantially not effected thereby since they are not oriented in any particular direction. As the rays 20 and 22 strike polarizer 16, they are linearly polarized thereby and divided substantially into components 20a and 22a which pass through or are transmitted by the polarizer and are shown as vibrating in a first direction while second components 20b and 22b are reflected backward by the polarizer 12 and is shown as having opposite linear polarization characteristics to the transmitted one. The differing polarization azimuths of the transmitted and reflected components are indicated by the lines and circles on rays 20a, 22a and 20b, 22b. The orientation of the optical axis of polarizer 16 determines the plane of vibration of the linearly polarized light passing therethrough and in the case of the preferred embodiment, the orientation is 45° to the horizontal as indicated previously. As reflected components 20b and 22b pass through quarter-wave plate 18, they are circularly polarized as indicated in the drawing and then will be reflected off reflector 10 and returned back through plate 18 and polarizer 12 as described in the above description.

As mentioned previously, either the polarizer disclosed in Ser. No. 762,211 which is of the diffusion type or that disclosed in Ser. No. 716,775, which is of the interference type, may be utilized with the headlight described herein. Both of these polarizers will transmit one component of light incident thereon and reflect backward a second component as described in their respective applications and thus are referred to herein generally as reflective-transmissive polarizers. Different shaped reflectors may be designed for each, as the diffusion type polarizer tends to scatter the reflected component backward while the interference type polarizer will direct the reflected component substantially in the direction with which it strikes the polarizer. Also, lens systems for the headlight may be provided externally thereof for directing the headlight beam to different parts of the road.

Since certain changes may be made in the above apparatus without departing from the scope of the invention herein involved, it is intended that all matter contained in the above description as illustrative and not in a limiting sense.

I claim:
1. Apparatus for projecting polarized light, comprising:
a concave light reflector having an open mouth;
a light source positioned within said reflector, said light source directing rays of light both directly from said source and indirectly off said reflector toward said open mouth of said reflector;
a reflective-transmissive polarizer, configured in thin sheet form, positioned over said open mouth of said reflector, the reflecting components thereof being arranged generally orthogonal to the direction of said light rays passing through said open mouth, for linearly polarizing and transmitting one component of light incident thereon and for linearly polarizing and reflecting backwardly another component of said incident light, the two components having opposite polarization characteristics; and
a quarter-wave plate located directly behind said polarizer for circularly polarizing said reflected component as it is reflected backward through said plate toward said concave reflector whereupon being reflected thereby said reflected component suffers a reversal of polarization characteristics and is directed back through said quarter-wave plate and converted thereby to linearly polarized light with the same polarization characteristics as said transmitted component and is transmitted by said thin reflective-transmissive polarizer, the two components reinforcing one another resulting in a beam of substantially uniformly polarized light emanating from said apparatus.

2. The apparatus of claim 1 wherein said light reflector is parabolic in shape and said light source is located at the focus thereof so that light from said source which is reflected off said reflector is directed toward the open mouth of said reflector in rays parallel with one another and the optic axis of said reflector.

3. The polarized light-projecting apparatus described in claim 1 wherein said reflective-transmissive polarizer is of the diffusion type which scatters the reflected polarization component backwardly through said quarter-wave plate toward said reflector.

4. The polarized light-projecting apparatus described in claim 1 wherein said reflective-transmissive polarizer is of the interference type which specularly reflects the reflected polarization component backwardly through said quarter-wave plate toward said reflector.